United States Patent
Rittenhouse

[15] 3,642,372
[45] Feb. 15, 1972

[54] WARNING LIGHT
[72] Inventor: John H. Rittenhouse, 20 Wildflower Road, Barrington, R.I. 02806
[22] Filed: Dec. 17, 1969
[21] Appl. No.: 885,839

[52] U.S. Cl. ................................................. 356/3, 340/104
[51] Int. Cl. ...................................... B60g 1/26, G01c 3/00
[58] Field of Search .................. 356/3; 340/25, 26, 103, 104; 350/317

[56] References Cited

UNITED STATES PATENTS

| | | | |
|---|---|---|---|
| 2,531,337 | 11/1950 | Knapp | 340/25 |
| 3,002,051 | 9/1961 | Tait | 350/317 X |
| 149,942 | 4/1874 | McMullin | 340/104 |
| 153,591 | 7/1874 | McMullin | 340/104 |
| 2,559,415 | 7/1951 | Field et al. | 340/103 X |

Primary Examiner—Ronald L. Wibert
Assistant Examiner—F. L. Evans
Attorney—Barlow & Barlow

[57] ABSTRACT

A distance indicating lens system mounted on the rear of a motor vehicle to give a visual warning to automobiles following behind. The visual signal being a projected light whose viewable color changes as the vehicle following approaches the advance vehicle.

4 Claims, 9 Drawing Figures

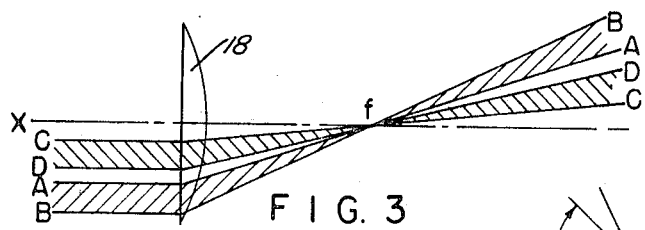
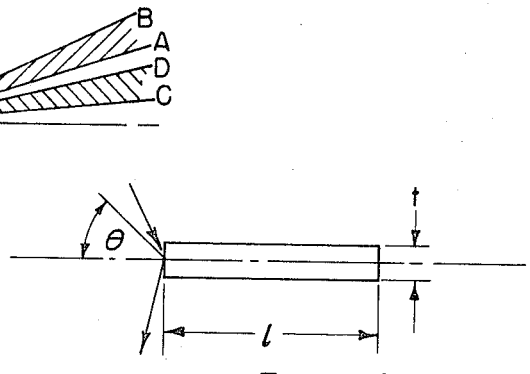
FIG. 3
FIG. 4
FIG. 5
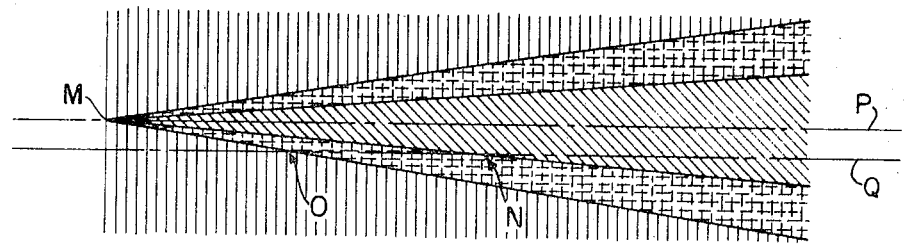
FIG. 6
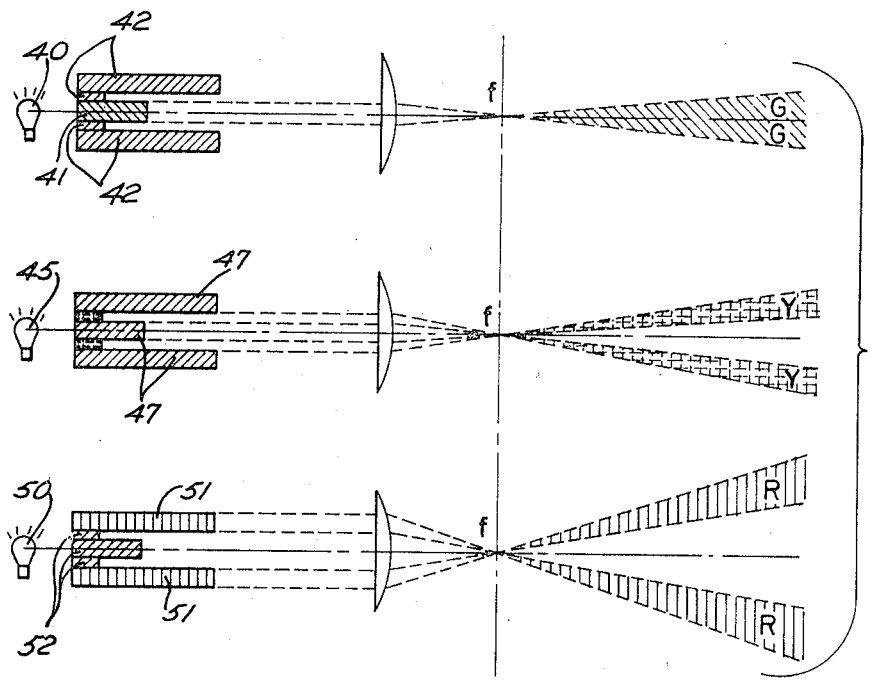
FIG. 9
INVENTOR
JOHN H. RITTENHOUSE
BY
Barlow & Barlow
ATTORNEYS

WARNING LIGHT

BACKGROUND OF THE INVENTION

The problems of judging a safe driving distance behind another motor vehicle have long plagued the motorist. This distance is important to know when approaching the vehicle ahead and when passing. This information is then used to control one's own speed.

The present invention relates to apparatus for apprising a motorist as to the distance at which he is following the vehicle ahead of him. With this easily determined information he can readily make adjustments in his own speed and become better prepared to cope with changing driving conditions.

It is an object of this invention to provide an early warning system for the motorist whereby he can maintain his state's prescribed safe distance from the vehicle ahead and thereby cut down on traffic accidents. With the ever increasing carnal destruction on our nation's highways, the present invention could lead to the saving of untold lives.

The invention also has applicability as a signal for warning a navigator to stay within the boundaries of a channel or as a signal to landing aircraft to guide them into their landing area.

SUMMARY OF THE INVENTION

Briefly, the invention projects a light beam that has been divided into different colors so that the colors are visible one at a time and are visible at predetermined distances away from the source of light. The foregoing is accomplished by taking a source of white light and running it through a color grid which allows the passage of only three different colors and each of these in their own distinct bands of light. These bands then proceed along predetermined parallel paths and pass through a planoconvex lens which directs the different light rays through the focal point of the lens. As these different-colored light rays pass through the focal point, they define different color regions where only light of one color is visually detected, and the boundaries between these different color regions are identifiable at known distances from the taillight.

Other objects and features will be apparent from the more detailed description to follow in conjunction with the appended drawings.

DESCRIPTION OF THE DRAWINGS

FIG. 3 is a diagrammatic view showing how the different bands of color are affected by the planoconvex lens;

FIG. 4 is a top view of one of the grid strips illustrating how light rays striking the grid strips outside of the critical angle are rejected by the grid strip;

FIG. 5 is a top view of one of the grid strips illustrating how light rays striking the grid strips at acceptable angles are transmitted through the strip and how their divergence is controlled;

FIG. 6 is explanatory of how the warning type of taillight actually signals the rearwardly following motor vehicle of the distance between the two vehicles;

FIG. 9 is a top diagrammatic view illustrating a three-light embodiment illustrating the light ray dispersion as the rays pass through the three separate grid and lens systems.

DESCRIPTION OF THE PREFERRED EMBODIMENTS

Figure 1:
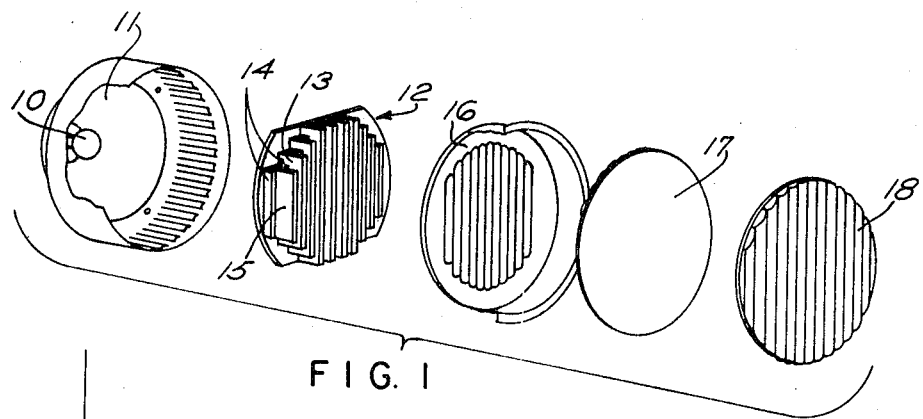
FIG. 1 is a detached perspective view of the invention showing the basic elements separated for ease of discussion.

With reference to FIG. 1, a white light source 10 is positioned between light reflector 11 and color grid 12. The grid is made up of strips of color transparent material adhered to each other on the sides of their base. Strip 15 transmits green light, strip 14 transmits yellow light and strip 13 transmits red light. As shown in FIG. 1, the strips reoccur across the width of the grid in the order of yellow, green, yellow, red, yellow, green, etc. Proceeding forward from the grid, a pair of collimating lenses 16 and 17 are found which are used to assist in cutting down the divergence of the light rays and to assist in controlling the width of the different light bands which are projected onto the planoconvex lens 18.

Figure 2:
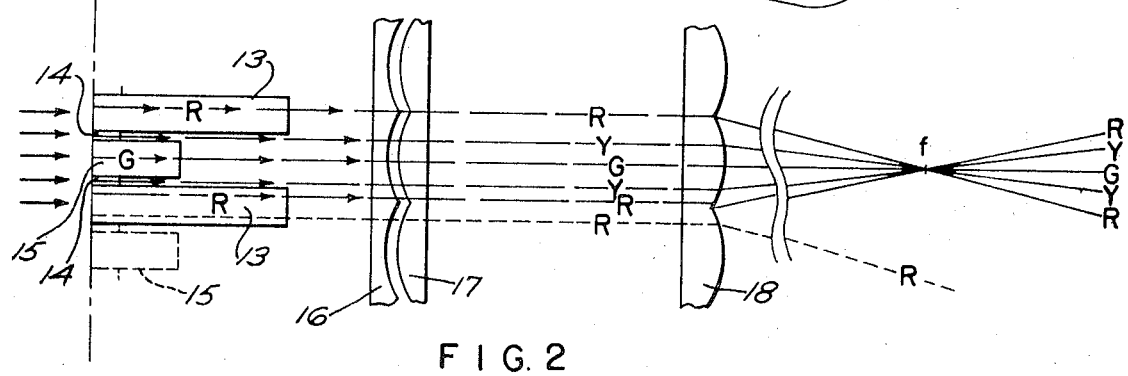
FIG. 2 is a top diagrammatic view in plan showing a portion of the color grid and the light ray path through the basic elements and their dispersion.

For ease of illustration, only a portion of the color grid and the lens system will be shown in FIG. 2, keeping in mind that what is described is only one of several similar units contiguously arranged across the breadth of the color grid and the individual lenses. FIG. 2 shows a diagrammatic view of how the white light is broken up into distinct bands of light and then passed through the focal point of the planoconvex lens 18. For purposes of illustration an arrow is used to represent a representative light ray passing through each individual grid member and accordingly the rays are marked, R, G and Y to indicate respectively red, green and yellow light rays. The white light approaches the color grid from the left, and as it passes through the individual colored grid members, only light passes through the individual colored grid members, only light of that particular color will pass through and form a band of light of that color. For example, white light entering the green transparent material will only transmit a band of green light out at the right end. As the bands of different colors pass through the grid section, the collimating lens system 16, 17 may be used to reduce divergence of the light rays and to assist in controlling the band width projected forward. The substantially parallel light rays are then projected onto the flat side of a planoconvex lens 18. The lens then focuses these light rays through its focal point $f$, and these light rays emerge at diverging angles to form sections where only light of a particular color will be visible. This may be best shown by looking at FIG. 3.

As shown in FIG. 3, a band of yellow light and a band of red light approach the flat side of a planoconvex lens from the left. The boundary of the red light is AB and the boundary of the yellow light is CD as they approach the lens. The lens then directs these light rays through its focal point $f$, and the new boundary for the red light band becomes BA and the boundary for the yellow light band becomes DC. A person standing in an area bounded by BA would only see the red light rays and a person standing in the DC area would only see the yellow light rays. The width of the band as it is projected upon the flat surface of the lens 18 and the location of the band in relation to the principal axis $x$ of the lens determine the extent of the diverging rays and the angle of the projection of the colored band. Bands of light of different colors projected on adjacent areas of the flat surface of the lens will emerge as adjacent rays through the focal point. Control of the location of the bands of light and determination of the proper color is the function of the color grid.

The grid 12 consists of colored transparent material in strips. The thickness of the strips is proportional to the desired width of the projected light band on the flat surface of the lens. The strips are arranged so that the color that is to be diverged the most by the lens is the farthest from the principal axis of the lens. The grid also has the function of adding coherence or parallelism to the rays of light. A beam of light, as from a spotlight, is not coherent. Although a parabolic reflector 11 may be placed behind the light source to produce parallel reflected rays, the rays emanating from the front of the light are of a diverging type. These stray rays will cause the required bands of light on the lens to become somewhat mixed and fuzzy in appearance and, therefore, lessen the desired effect. The grid, by its construction, assists in eliminating most of the stray rays and controlling others. This is accomplished by reflection of light, both internally and externally, from the surfaces of the strips of material.

FIGS. 4 and 5 are used to show how individual rays are affected as they strike the back of each individual grid section.

Any stray rays that strike the polished surfaces of the transparent material at an angle greater than the critical angle $\theta$ will be totally reflected as shown in FIG. 4. The critical angle $\theta$ is measured from the perpendicular to the surface. It is about 45°, plus or minus a few degrees depending upon the material. Light striking the surface at an angle less than the critical angle $\theta$ will enter the material, as shown in FIG. 5 and will be diffracted toward the center of the grid strip. Due to the polished reflective surfaces of the strip, there will be internal reflection of the ray throughout the light rays' linear path through the strip. The strips are of different lengths $l$ along the axial path of the optical system in order to substantially collimate the light rays and restrict the amount of divergence of the light rays as they exit from the color-transmitting sections. The desired angle of divergence from the lens requires different thicknesses $t$ of material. The thicker the $t$ dimension of the strip, the greater the $l$ dimension of the color-transmitting strip must be to control the divergence of rays being projected onto the flat surface of the lens.

Proportions are worked out so that the amount of divergence as the rays pass from the strips is kept within the same limits. However, a collimating lens system may be used also to assist in cutting down the divergence and assist in controlling the bandwidth projected on the lens. Precision manufacturing techniques should eliminate the need for the collimating lens system.

For a diagram showing how the signal light works in actual practice, we look to FIG. 6. The taillight must be placed such that it is offset from the viewer. This is done by mounting the taillight system on the right rear fender or body of a vehicle. In FIG. 6 the taillight on the right rear of the vehicle is represented by the point M and point M lies on the path P of the moving taillight. The viewer, a driver of another car following behind, is seated on the left side of his vehicle and the path along which he travels is represented by line Q. As the driver of the rear car approaches the car with the taillight system, he is effectively cutting across the various colored beams of light. The geometry of the light system disclosed in the figure is such that at a separation of six car lengths or more, the driver is in the green visible area. Point N in the figure would represent a distance of six car lengths behind the lead vehicle. Between three and six car lengths' separation, he is in the yellow visible area. Point O represents a point three car lengths behind the lead vehicle. Closer than three lengths, he is in the red visible area. However, the distances from the advance car in which only a specific color is visible may be varied by changing the $t$ dimension of the color-transmitting strips. For example, an increase in the $t$ dimension of a yellow strip would increase the width of the yellow color beam which strikes the planoconvex lens. With a wider band new boundaries would be produced by the yellow light beam after it had passed through the focal point of the lens. Therefore, the distances at which you would pass into and out of the yellow visible light zone would be changed. In this manner you can distance the various visible light zones to suit one's purpose. Likewise, a change in the focal length of the planoconvex lens could also vary the boundary of the various physical color zones since this also changes the angle at which the light rays pass through the focal point of the lens.

Figures 7, 8:
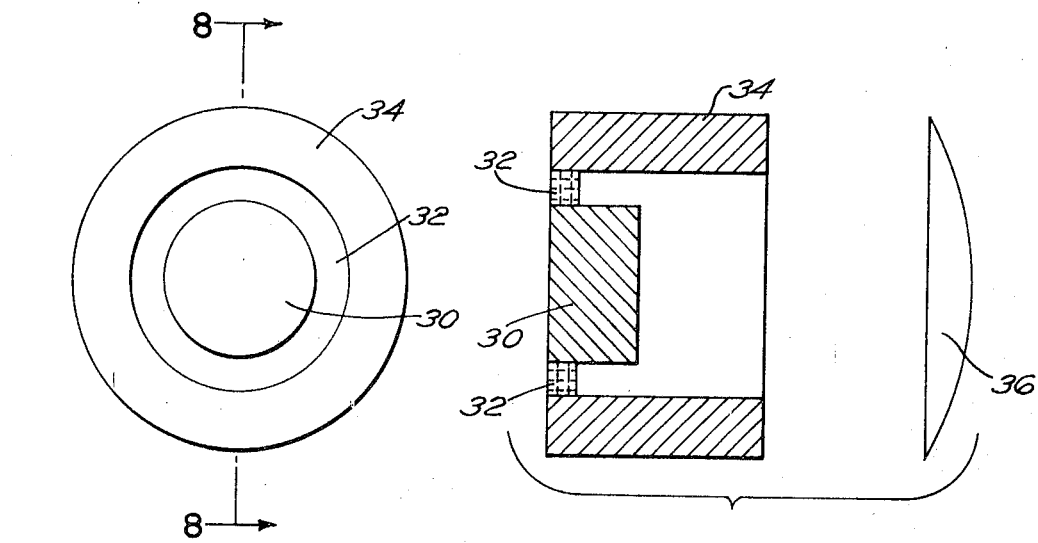
FIG. 7 is an alternative embodiment showing a grid arrangement for use with a lens of spherical design.
FIG. 8 is a sectional view taken along line 8—8 of FIG. 7 and also having a spherical lens placed forwardly to aid in understanding the grid's functional use.

Other geometry and proportions can be used to obtain different distances and characteristics. For example, a lens of spherical design could be used, but this would require annular grid members of transparent material instead of elongated strips. FIG. 7 shows such a grid with a green center 30, a yellow ring 32, and a red ring 34. FIG. 8 is a cross section of the grid in FIG. 7 with a spherical planoconvex lens 36 placed in front to aid in understanding its operation.

The basic illustrated embodiment contains a simple light source, and all colors emanate through the same lens. It is also possible to use multiple light sources, one color being projected from each light source. This is accomplished by having one or two of the transparent colored strips replaced by black opaque strips. An example of this would be a three light construction as shown in FIG. 9. The extreme right light 40 would have a grid strip 41 of green transparent material, the red and yellow strips would be replaced by black strips 42. The center light 45 would have a grid strip 46 of yellow transparent material with the red and green strips being replaced by black strips 47. Finally, the left light 50 of the group would have a grid strip 51 of red transparent material and the green and yellow strips would be replaced by black strips 52. This grouping of three lights would still have to be on the right side of the car. As seen from the diagram only green light rays from light 40 would be visible in the green light area G. There would be no other visible light outside the boundary lines of the green light area. Similarly lights 45 and 50 would only pass visible yellow and red light rays, respectively, and there would be no other visible light outside the boundary lines of the yellow light area Y and the red light area R. As a driver following behind approaches from the rear he would pass through the different visible colors areas. The effect he would experience would be that of seeing light being turned on and off successively with dark periods being seen between the different colored lights as the distance of separation diminished, due to the interspersed areas through which no visible light is projected.

What is claimed is:

1. A warning light for indicating the distance from the light by a visual signal which changes color as the distance between the light and the viewer changes, said warning light comprising a white light source, color grid means having polished external surfaces positioned forward of said light source and on opposite sides of a principal axis for substantially collimating the light rays and for passing selective light rays of different wavelengths, said color grid means comprising a color grid made up of a plurality of vertically oriented strips of different elongations in the direction of the axis for transmitting different colors and which are attached to each other transversely at their bases, each of said different strips transmitting a band of light rays of a specific wavelength and said strips positioned in a selective reoccurring pattern, and optical means on opposite sides of the principal axis for receiving these light rays of different wavelengths and dispersing them in such a pattern as to produce a different color signal at predetermined distances from the warning light, said optical means comprising a planoconvex lens which receives the collimated light rays of different wavelengths on its flat surface and directs the light waves through the focal point of the lens to produce a different colored signal at predetermined distances from the warning light due to the divergence of different light rays as they pass through said focal point, said planoconvex lens comprising vertically oriented longitudinally dimensioned planoconvex lens sections.

2. A warning light as in claim 1 where said strips are in a reoccurring order of yellow, green, yellow, red.

3. A warning light as in claim 1 wherein the dimensions of the strips in regard to the length which they protrude from the base of the color grid varies according to the length of the light waves which the strip transmits and the length required to substantially collimate the light rays passing through the strip.

4. A warning light as in claim 1 further comprising auxiliary collimating means comprising a pair of collimating lenses placed in front of the color grid, said lens surfaces being vertically oriented to match up with vertically oriented strips of the color grid.

* * * * *